United States Patent
Kummetz et al.

(10) Patent No.: US 9,735,999 B2
(45) Date of Patent: Aug. 15, 2017

(54) DISTRIBUTED ANTENNA SYSTEM INTERFACE FOR PROCESSING DIGITAL SIGNALS IN A STANDARDIZED FORMAT

(75) Inventors: Thomas Kummetz, Forest, VA (US); Christopher G. Ranson, Concord, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 13/493,060

(22) Filed: Jun. 11, 2012

(65) Prior Publication Data

US 2012/0314797 A1  Dec. 13, 2012

Related U.S. Application Data

(60) Provisional application No. 61/495,093, filed on Jun. 9, 2011.

(51) Int. Cl.
*H04L 27/00* (2006.01)
*H04L 27/34* (2006.01)
*H04B 1/40* (2015.01)

(52) U.S. Cl.
CPC .......... *H04L 27/34* (2013.01); *H04B 1/40* (2013.01)

(58) Field of Classification Search
CPC combination set(s) only.
See application file for complete search history.

(56) References Cited

U.S. PATENT DOCUMENTS

| 5,263,018 | A  | * | 11/1993 | Christopher | 370/206 |
| 6,760,804 | B1 | * | 7/2004  | Hunt        | G06F 9/541 |
|           |    |   |         |             | 370/310 |
| 7,529,215 | B2 |   | 5/2009  | Osterling   |         |
| 7,924,054 | B1 |   | 4/2011  | Doubler et al. |      |
| 2001/0055135 | A1 | * | 12/2001 | Sigloch    | 359/124 |

(Continued)

FOREIGN PATENT DOCUMENTS

| CN | 101842995 | 9/2010 |
| WO | WO2009/151893 | 12/2009 |
| WO | 2012170983 | 12/2012 |

OTHER PUBLICATIONS

International Patent Application No. PCT/US2012/041829, International Search Report and Written Opinion mailed Jan. 10, 2013 (16 pages).

(Continued)

*Primary Examiner* — Wednel Cadeau
(74) *Attorney, Agent, or Firm* — Fogg & Powers LLC

(57) ABSTRACT

An interface is provided for processing digital signals in a standardized format in a distributed antenna system. One example includes a unit disposed in a distributed antenna system. The unit includes an interface section and an output section. The interface section is configured for outputting a first complex digital signal and a second complex digital signal. The first complex digital signal is generated from a digital signal in a standardized format received from a digital base station. The output section is configured for combining the first complex digital signal and the second complex digital signal into a combined digital signal. The output section is also configured for outputting the combined digital signal. The combined digital signal comprises information to be wirelessly transmitted to a wireless user device.

20 Claims, 10 Drawing Sheets

(56) References Cited

U.S. PATENT DOCUMENTS

| | | | |
|---|---|---|---|
| 2005/0152349 A1* | 7/2005 | Takeuchi | H04J 3/12 370/373 |
| 2006/0089173 A1 | 4/2006 | Chun | |
| 2007/0099667 A1 | 5/2007 | Graham et al. | |
| 2008/0045254 A1 | 2/2008 | Gupta et al. | |
| 2008/0119232 A1 | 5/2008 | Oh et al. | |
| 2008/0151846 A1* | 6/2008 | Scheinert | H04B 7/2606 370/338 |
| 2008/0181171 A1 | 7/2008 | Koziy et al. | |
| 2008/0199183 A1* | 8/2008 | Liu | H04J 3/1617 398/103 |
| 2009/0036168 A1 | 2/2009 | Nawata et al. | |
| 2009/0061940 A1 | 3/2009 | Scheinert et al. | |
| 2009/0180426 A1 | 7/2009 | Sabat et al. | |
| 2009/0238566 A1 | 9/2009 | Boldi et al. | |
| 2009/0252206 A1 | 10/2009 | Rheinfelder et al. | |
| 2010/0087227 A1 | 4/2010 | Francos et al. | |
| 2010/0246487 A1 | 9/2010 | Aoyama et al. | |
| 2010/0278530 A1* | 11/2010 | Kummetz | H04W 88/085 398/41 |
| 2011/0032910 A1 | 2/2011 | Aarflot et al. | |
| 2011/0070845 A1 | 3/2011 | Chen et al. | |
| 2011/0310839 A1* | 12/2011 | Kenington et al. | 370/331 |
| 2012/0027145 A1* | 2/2012 | Uyehara | H04J 3/0685 375/356 |
| 2012/0039254 A1 | 2/2012 | Stapleton et al. | |
| 2012/0039320 A1 | 2/2012 | Lemson et al. | |

OTHER PUBLICATIONS

China Patent Office, "First Office Action for CN Application No. 201280028091.9", "from Foreign Counterpart to U.S. Appl. No. 13/493,060", Mar. 31, 2016, pp. 1-8, Published in: CN.

State Intellectual Property Office of the People's Republic of China, "Notification of the Second Office Action CN Patent Application No. 201280028091.9", "from Foreign Counterpart of U.S. Appl. No. 13/493,060", Nov. 8, 2016, pp. 1-5, Published in: CN.

European Patent Office, "Communication pursuant to Article 94(3) EPC for EP Application No. 12733253.4", "from Foreign Counterpart to U.S. Appl. No. 13/493,060", dated Feb. 24, 2017, pp. 1-5, Published in: EP.

Adinoyi et al., "Cooperative Relaying in Multi-Antenna Fixed Relay Networks", "IEEE Transactions on Wireless Communications", Feb. 2007, pp. 533-544, vol. 6, No. 2.

* cited by examiner

DISTRIBUTED ANTENNA SYSTEM INTERFACE FOR PROCESSING DIGITAL SIGNALS IN A STANDARDIZED FORMAT

CROSS-REFERENCE TO RELATED APPLICATIONS

This application claims priority to U.S. Provisional Application Ser. No. 61/495,093 filed Jun. 9, 2011 and titled "Distributed Antenna System Interface for Processing Digital Signals in a Standardized Format," the contents of which are hereby incorporated by reference.

TECHNICAL FIELD

The present invention relates generally to telecommunications and, more particularly (although not necessarily exclusively), to an interface for processing digital signals in a standardized format in a distributed antenna system.

BACKGROUND

A distributed antenna system ("DAS") can be used to extend the coverage of a cellular communication system. For example, a DAS can extend coverage to areas of traditionally low signal coverage within buildings, tunnels, or in areas obstructed by terrain features. A DAS can extend coverage by receiving signals from a base transceiver station of a cellular communication system and re-transmitting the signals directly into low-coverage areas.

A DAS can include a master unit in communication with carrier systems, such as base transceiver stations of cellular service providers. The master unit can receive signals from one or more base stations via interface devices. A non-limiting example of an interface device is an interface card. The master unit can include multiple interface cards, each of which receives an analog RF signal from an analog base station. Interface cards can convert the received analog signals into complex digital signals. The complex digital signals from the interface cards can be combined at a backplane of the master unit for transmission to remote antenna units as a serialized data stream. The remote antenna units can be physically separate from the master unit, but in communication with the master unit over a serial link. A remote antenna unit can wirelessly communicate information in the complex digital signals to wireless user devices positioned in a coverage area.

Some base stations output information as digital signals in a standardized format. These base stations communicate the digital signals in the standardized format to a remote radio head. The remote radio head is in direct communication with the base station and can include a high power RF transceiver that processes the digital signals in the standardized format for transmission to a wireless user device.

Digital signals in a standardized format can include data packets formatted according to standardized telecommunication protocols. Non-limiting examples of standardized telecommunication protocols include the Common Public Radio Interface ("CPRI"), the Open Radio Equipment Interface ("ORI"), and the Open Base Station Standard Initiative ("OBSAI") protocols. Base stations communicating such data to remote radio heads expect a response communication in a conforming format from the remote radio heads to coordinate communication or otherwise. Remote radio heads can be configured to provide the expected response communication. In accordance with a standardized communication protocol, each data packet can include control data for coordinating data communication between the base transceiver station and the remote radio head. Each data packet can also include carrier data, such as voice or other information, that is to be transmitted to a wireless user device.

Current DASs are unable to communicate with base stations that use digital signals in a standardized format. For example, interface cards in a master unit of a DAS are unable to process the digital signals in the standardized format for use by RF transceivers that are remote antenna units of a DAS and are unable to provide a suitable response to the base station providing the signals. Furthermore remote radio heads configured to process digital signals in a standardized format may be unusable as RF transceivers in a DAS.

Accordingly, a DAS capable of processing digital signals in a standardized format is desirable. A DAS capable of communicating with a remote radio head configured to process digital signals in a standardized format is also desirable.

SUMMARY

One example includes a unit disposed in a distributed antenna system. The unit includes an interface section and an output section. The interface section is configured for outputting a first complex digital signal and a second complex digital signal. The first complex digital signal is generated from a digital signal in a standardized format received from a digital base station. The output section is configured for combining the first complex digital signal and the second complex digital signal into a combined digital signal. The output section is also configured for outputting the combined digital signal. The combined digital signal comprises information to be wirelessly transmitted to a wireless user device.

Another example includes a digital interface device. The digital interface device includes a physical layer device and a de-framer. The physical layer device is configured for receiving a digital signal in a standardized format. The de-framer is configured for extracting carrier data from the digital signal in the standardized format. The de-framer is also configured for generating a complex digital signal from the carrier data. The complex digital signal includes a plurality of digital samples representing an in-phase component and quadrature component of a signal represented by the carrier data.

Another example includes a distributed antenna system. The distributed antenna system includes a base station emulator module and a remote radio head. The base station emulator module is configured for emulating a source of digital signals in a standardized format. The remote radio head is configured for receiving digital signals in the standardized format from a digital interface device.

These illustrative aspects and examples are mentioned not to limit or define the invention, but to aid understanding of the inventive concepts disclosed herein. Other aspects, advantages, and features of the present invention will become apparent after review of the entire disclosure.

DETAILED DESCRIPTION

Figure 1:
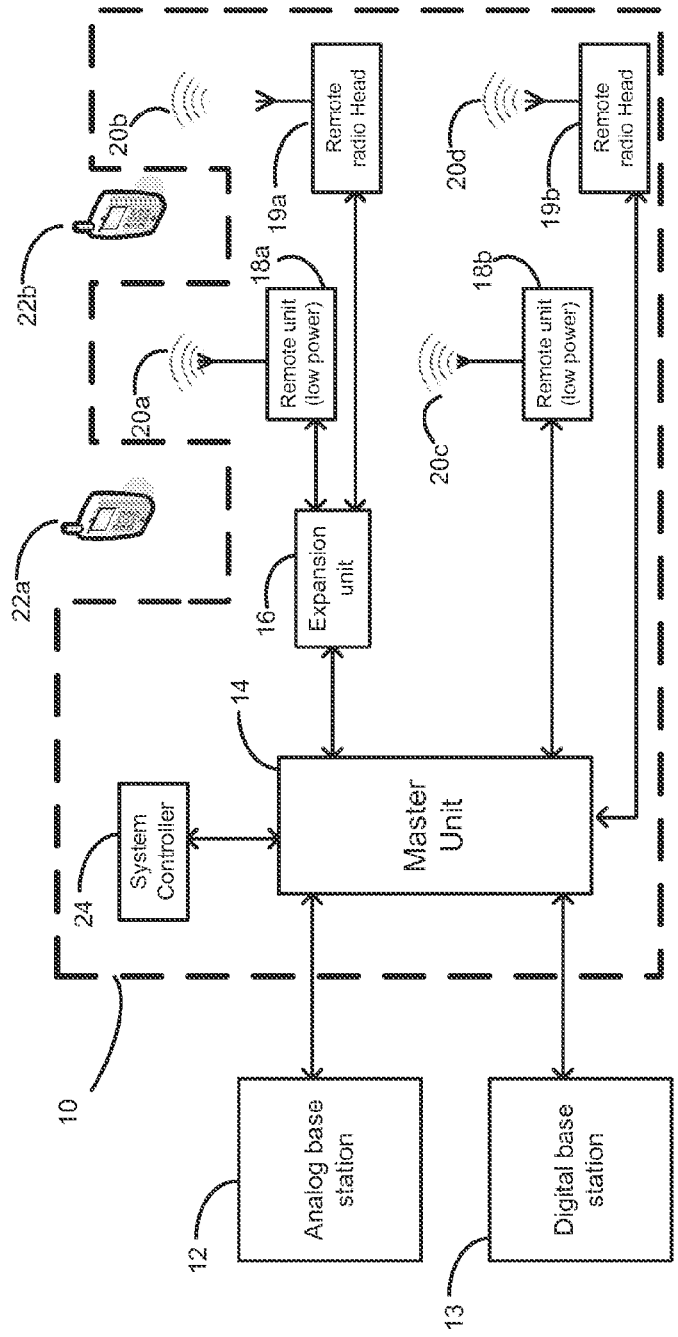
FIG. 1 is a schematic view of a distributed antenna system in which one or more digital interface cards for processing digital signals in a standardized format can be disposed according to one aspect.

Certain aspects and features of the present invention are directed to a DAS that can process signals received from a base station in a standardized format for wireless transmission to a user device (i.e. downlink) and can process signals from the user device into the standardized format for distribution to the base station (i.e. uplink). The DAS can include a unit, such as a master unit, that has a digital interface card for transforming downlink digital signals in a standardized format into complex digital signals and transforming uplink complex digital signals into digital signals in the standardized format. A standardized format for digital signals can include one or more protocols approved by a standards body and specifying how to communicate packetized telecommunications data among devices in a telecommunications system. Non-limiting examples of standardized formats include signals formatted according to the Common Public Radio Interface ("CPRI") protocol, signals formatted according to the Open Radio Equipment Interface ("ORI") protocol, and signals formatted according to the Open Base Station Standard Initiative ("OBSAI") protocol. The DAS can communicate uplink and downlink signals with a user device as cellular telecommunications.

In some aspects, the DAS includes a master unit with an interface section having multiple interface cards. The interface cards can include the digital interface card and an analog interface card. The analog interface card can transform downlink analog signals received from a base station into complex digital signals. The master unit of a DAS can also include an output section, such as a backplane, for combining complex digital signals received from the digital interface card with complex digital signals received from the analog interface card. The system can output the combined digital signals as serialized downlink data to one or more RF transceivers for wirelessly communicating with user devices. Non-limiting examples of RF transceivers may include remote antenna units and remote radio heads. The backplane can split uplink digital signals received from one or more RF transceivers into uplink digital signals that are provided to the analog interface card and into uplink digital signals that are provided to the digital interface card.

A digital interface card according to some aspects can include a framer/de-framer for extracting carrier data from the data packets of digital signals in the standardized format. In the downlink direction, the framer/de-framer can convert the carrier data into complex digital signals. In the uplink direction, the framer/de-framer can combine carrier data and control data into data packets forming a digital signal in the standardized format. The digital interface card can also include additional circuitry for re-sampling, filtering, and adjusting the gain of the complex digital signals for processing by a backplane of a master unit.

A DAS can include a link interface for communicating with one or more RF transceivers. A link interface according to some aspects includes a base station emulator module that can emulate a source of digital signals in a standardized format. The base station emulator module can receive signals in a non-standardized format and generate signals in the standardized format, including control information. The signals in the standardized format can be provided to a component, such as a remote radio head. Non-limiting examples of signals in the non-standardized format can include analog signals and non-standard digital signals. The link interface may also receive uplink signals in the standardized format and transform these signals into uplink complex digital signals. The link interface having the base station emulator module may be disposed in a master unit or an expansion unit that is in communication with a master unit.

Detailed descriptions of these aspects are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present invention.

FIG. 1 depicts a DAS 10 having a master unit 14 in which one or more digital interface cards for processing digital signals in a standardized format can be disposed. The DAS 10 can be positioned in an area such as a building environment to extend wireless communication coverage.

The DAS 10 can optionally receive downlink analog signals from at least one analog base station 12 via a wired or wireless communication medium. The DAS 10 can also optionally provide uplink analog signals to the analog base station 12.

The DAS 10 can also receive downlink digital signals in a standardized format from at least one digital base station 13 via a wired or wireless communication medium. The DAS 10 can provide uplink digital signals in the standardized format to the digital base station 13.

Digital signals in the standardized format can include data packets formatted according to a standard communication protocol. Each data packet can include one or more data frames. One data frame can include control data. Control data can include data for coordinating communication between digital base station 13 and a device receiving digital signals in a standardized format. Another frame can include carrier data. Carrier data can include voice data and other information data to be transmitted by the DAS 10 from digital base station 13 to user devices 22a, 22b. Non-limiting examples of devices in the DAS 10 that can receive and process digital signals in a standardized format are master units 14 and remote radio heads 19*a*, 19*b*.

The master unit 14 can communicate uplink and downlink signals between analog base station 12 or digital base station 13 and one or more RF transceivers distributed in the environment to provide coverage within a service area of the DAS 10. The master unit 14 can also provide signals to an expansion unit 16 via a suitable communication medium. Non-limiting examples of a suitable communication medium include optical fiber or copper cable, such as a coaxial cable. The expansion unit 16 can extend the range of master unit 14. For example, the master unit 14 may transmit optical downlink signals over an optical fiber link, or other suitable communication medium, to the expansion unit 16. The expansion unit 16 can convert the optical downlink signals to electrical downlink signals and provide the electrical downlink signals to additional RF transceivers over a copper cable, such as a coaxial cable, or other suitable communication medium.

The RF transceivers can include remote units 18*a*, 18*b* and remote radio heads 19*a*, 19*b*. The RF transceivers can communicate with the master unit 14 via any communication medium capable of carrying signals between the master unit 14 and the one or more RF transceivers. Non-limiting examples of a suitable communication medium include copper wire (such as a coaxial cable), optical fiber, and microwave link. The RF transceivers can service a number of different user devices 22*a*, 22*b*, such as cellular phones, operating in the environment of the DAS 10.

Remote units 18*a*, 18*b* may be low power devices capable of communicating signals between the master unit 14 or the expansion unit 16 and user devices 22*a*, 22*b*. A remote unit according to some aspects can convert the digital signals from the master unit 14 or the expansion unit 16 to an analog RF signal that is radiated for receipt by a user device.

Remote radio heads 19*a*, 19*b* can be high power devices capable of communicating signals between the master unit 14 or the expansion unit 16 and user devices 22*a*, 22*b*. As compared to the remote units 18*a*, 18*b*, each of the remote radio heads 19*a*, 19*b* can perform more signal processing, such as performing error checking of a digital signal in a standardized format. Error checking can include identifying any dropped data packets or data packets transmitted out of order.

The DAS 10 may also include a system controller 24. The system controller 24 can control each of the master units 14 and expansion units 16 processing the signals that are radiated as RF analog signals 20*a*-*d*.

Although the DAS 10 is depicted as including one master unit 14, one expansion unit 16, two remote units 18*a*, 18*b*, and two remote radio heads 19*a*, 19*b*, any number (including one) of each can be used. Furthermore, a DAS according to some aspects can be implemented without system controller 24 and without the two remote units 18*a*, 18*b* or the two remote radio heads 19*a*, 19*b*.

The master unit 14 can receive analog signals from analog base station 12 and can receive digital signals in a standardized format from digital base station 13. The master unit 14 can transform both the analog signals and the digital signals in a standardized format into the same signal format that is transmitted to remote units 18*a*, 18*b*. In some aspects, master unit 14 can also emulate a source of digital signals in a standardized format for communicating the signals to remote radio heads 19*a*, 19*b*. Although the DAS 14 is depicted as receiving signals from an analog base station 12 and a digital base station 13, a DAS 14 according to certain aspects can receive signals from one or more digital base stations and combine signals from those digital base stations for transport to remote units or remote radio heads without combining the signals with signals from an analog base station or otherwise interfacing with an analog base station.

Figure 2:
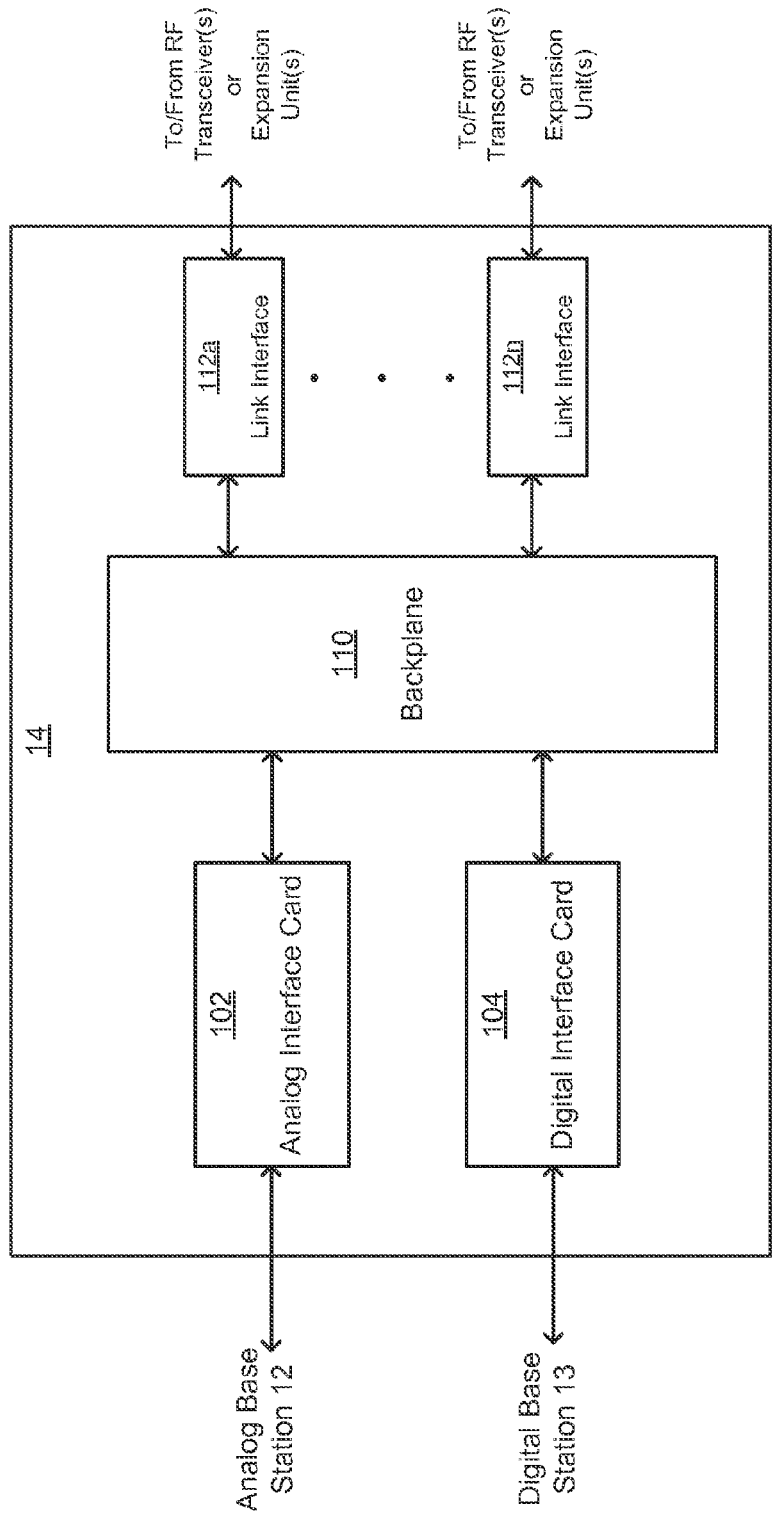
FIG. 2 is a block diagram of a master unit with an interface section, an output section, and a backplane according to one aspect.

FIG. 2 depicts an aspect of the master unit 14 having an interface section, an output section, and a backplane 110. The interface section can include an analog interface card 102 and a digital interface card 104. In other aspects, the interface section can include (i) the digital interface card 104 (or any number of interface cards), but not the analog interface card 102 or (ii) any number of digital interface cards and analog interface cards. The output section can include link interfaces 112*a*-*n*.

The analog interface card 102 can transform analog signals received from analog base station 12 into complex digital signals. A non-limiting example of a complex digital signal is a digital I/Q signal that includes complex digital samples. Complex digital samples include samples representing the in-phase ("I") component and quadrature ("Q") component of the sampled signal. Complex digital signals can also include digital signals using real samples rather than complex samples. A non-limiting example of such a complex digital signal is a digital I/Q signal with a quadrature component correlated with the in-phase component such that the sampled signal can be accurately represented using only real samples.

The analog interface card 102 can also transform uplink digital signals into uplink analog signals and provide the uplink analog signals to the analog base station 12. The digital interface card 104 can transform digital signals in a standardized format received from the digital base station into complex digital signals. The digital interface card 104 can also transform uplink digital signals into uplink digital signals in a standardized format that are provided to the digital base station 13.

In the downlink direction, the complex digital signals generated by the analog interface card 102 and the complex digital signals generated by the digital interface card 104 can be provided to the backplane 110. The backplane 110 can combine the complex digital signals into combined downlink digital signals. In some aspects, combining the complex digital signals can include multiplexing parallel signals into a serialized signal. In other aspects, combining the complex digital signals can include summing or adding signals associated with frequencies in a common frequency band. The link interfaces 112*a*-*n* can provide the combined downlink digital signals to RF transceivers and/or expansion units that are in communication with the master unit 14. Each link interface can correspond to a communication link. In some aspects, each link interface corresponds to one component coupled to the master unit 14 over a communication link. The component may be an RF transceiver, such as a remote radio head or a remote antenna unit, or an expansion unit.

In an uplink direction, the link interfaces 112*a*-*n* can receive uplink digital signals from one or more RF transceivers and expansion units 16. The uplink digital signals can be provided to the backplane 110. The backplane 110 can distribute the uplink digital signals as a whole or in part by the interface cards included in the master unit 14 and provide the appropriate uplink digital signals to the appropriate interface card. For example, uplink digital signals can be distributed individually, separately, or together, such as through a process to fan-out the signals or to de-multiplex the signals.

In some embodiments, multiple digital interface cards can process digital signals in different standardized formats. For example, an interface section may include (i) one or more digital interface cards that can receive and transmit signals formatted according to the CPRI standard, (ii) one or more digital interface cards that can receive and transmit signals formatted according to the ORI standard, and (iii) one or more digital interface cards that can receive and transmit signals formatted according to the OBSAI standard. The digital interface cards 104 can transform the digital signals in different standardized formats, or the same standardized format, into complex digital signals that can be combined at a backplane 110. In other aspects, an interface section can include multiple digital interface cards 104 processing digital signals in the same standardized format that are communicated using different frequency band configurations or data rates.

Figure 3:
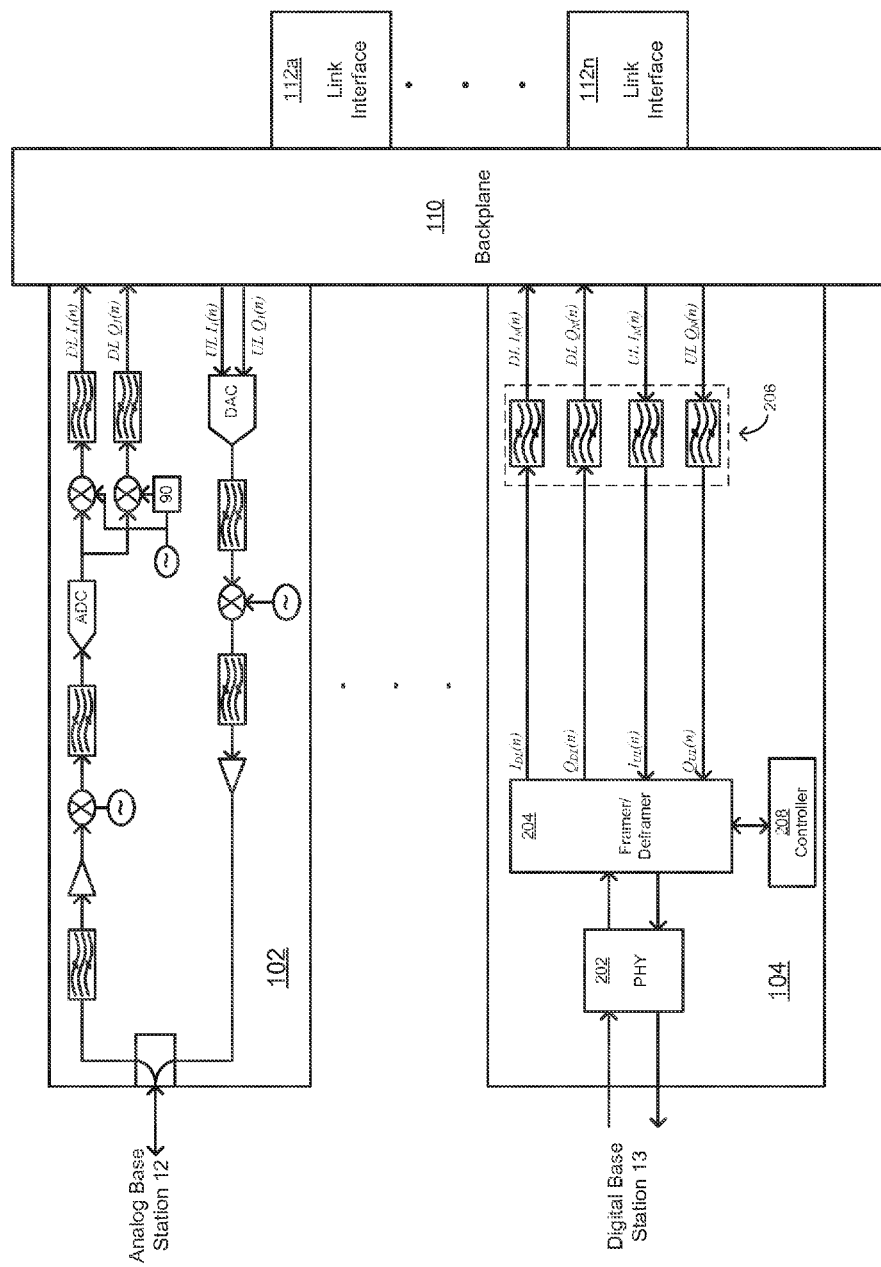
FIG. 3 is a partial schematic view of interface cards in the master unit of FIG. 2 according to one aspect.

FIG. 3 depicts additional details of the analog interface card 102 and the digital interface card 104 according to one aspect. The analog interface card 102 can include circuitry for transforming downlink analog signals into downlink complex digital signals and circuitry for transforming uplink complex digital signals into uplink analog signals. The circuitry can include mixers, local oscillators, an analog-to-digital converter ("ADC"), a digital-to-analog converter ("DAC"), filters, and amplifiers. An example of a downlink complex digital signal is a complex digital I/Q signal, indicated by an in-phase, I, component DL $I_1(n)$ and a quadrature, Q, component DL $Q_1(n)$ in FIG. 3. In some aspects, DL $I_1(n)$, DL $Q_1(n)$ are baseband digital signals. Analog interface card 102 can provide the downlink complex digital signals DL $I_1(n)$, DL $Q_1(n)$ to the backplane 110.

Digital interface card 104 can include circuitry for transforming downlink digital signals in a standardized format into downlink complex digital signals. Circuitry for transforming downlink digital signals in a standardized format can include physical layer ("PHY") device 202, framer/de-framer module 204, filter bank 206, and controller 208.

In a downlink direction, PHY 202 can provide a physical interface to the communication medium via which downlink signals are received from digital base station 13. For example, PHY 202 can receive an optical downlink signal transmitted via fiber-optic cable and convert the optical downlink signal to an electrical downlink signal for processing by digital interface card 104. A non-limiting example of a PHY 202 is a digital transceiver.

PHY 202 can also perform error correction on data received from digital base station 13. Error correction can include detecting whether errors occurred during the transmission of the data packets. Non-limiting examples of errors may include failing to receive one or more data packets or receiving the data packets out of order. PHY 202 can request that the digital base station 13 re-send lost data packets. PHY 202 can re-order disordered data packets. PHY 202 can also synchronize communications between the digital interface card 104 and the digital base station 13. PHY 202 can provide downlink signals to framer/de-framer module 204. For example, the PHY 202 can recover a reference clock from signals received from the digital base station 13. The recovered clock signal can be provided to components, such as one or more phase-locked loop ("PLL")/voltage controlled oscillator ("VCO") devices, that can use the recovered reference clock signal from the digital base station 13 to output a system reference usable to frequency lock the DAS to the digital base station 13. A transmit reference clock signal can also be generated by one or more of the PLL/VCO devices based on the recovered clock signal. The transmit reference clock signal can be used by the PHY 202 for transmitting data back to the digital base station 13.

The framer/de-framer module 204 can de-frame the downlink digital signal in a standardized format. The downlink digital signal in the standardized format can include data packets in a frame structure specified by the standardized format. De-framing can include extracting control data and carrier data from the data packets. The framer/de-framer module 204 can provide the control data to controller 208. The framer/de-framer module 204 can provide the carrier data, which may include I/Q digital data $I_{DL}(n)$, $Q_{DL}(n)$, to a filter bank 206 as a downlink complex digital signal.

The control data can include control data extracted from the downlink digital signals in a standardized format. The controller 208 can use downlink control data from framer/de-framer module 204 to generate a corresponding uplink control data for uplink digital signals in a standardized format. In some aspects, the master unit 14 can include the system controller 24 that can control each controller 208 in each digital interface card 104 by, for example, assigning tasks to each controller 208.

The filter bank 206 can include one or more downlink filters for passing specific frequency bands of the downlink complex digital signal. In some aspects, the filter bank 206 can output a band of frequencies or individual channels within one or more bands. For example, the downlink complex digital signal $I_{DL}(n)$, $Q_{DL}(n)$ may include a component signal at frequencies within the A and B frequency blocks of the cellular frequency band (i.e. 824-894 MHz). The filter bank 206 can include downlink filters configured to pass the frequencies within the A and B frequency blocks and reject any other component frequencies. The filter bank 206 can output a filtered downlink complex digital signal, depicted in FIG. 3 as I/Q signals, DL $I_N(n)$, DL $Q_N(n)$. The I/Q signals can be provided to backplane 110. The backplane 110 can combine the downlink I/Q signals from the analog interface card 102 and the digital interface card 104 and provide the combined downlink signals to link interfaces 112a-n for transmission to RF transceivers.

Uplink digital signals can be received by one or more of the link interfaces 112a-n and provided to the backplane 110. The backplane 110 can split the uplink digital signals according to the interface card to which particular uplink digital signals are to be provided. For example, some of the uplink digital signals can be split and provided to the analog interface card 102 as complex digital signals and some of the uplink digital signals can be split and provided to the digital interface card 104 as complex digital signals.

The analog interface card 102 can transform uplink complex digital signals, which may be I/Q signals UL $I_1(n)$, UL $Q_1(n)$, into uplink analog signals using the circuitry described above.

The digital interface card 104 can include circuitry for transforming uplink complex digital signals into uplink digital signals in a standardized format for transmission to digital base station 13. An uplink complex digital signal is depicted in FIG. 3 as I/Q signals, UL $I_N(n)$, UL $Q_N(n)$. Circuitry for transforming uplink complex digital signals can include filter bank 206, framer/de-framer module 204, and PHY 202.

The filter bank 206 can include uplink filters that can filter the I/Q uplink signal from the backplane 110. Each uplink filter can pass an individual component of the I/Q uplink signal. Filtered I/Q uplink signals, depicted as $I_{UL}(n)$, $Q_{UL}(n)$, can be provided to the framer/de-framer module 204.

In some aspects, the PHY 202 can receive more than one channel from the digital base station 13 and can transmit more than one channel to the digital base station 13. For example, the digital interface card 104 may include a demultiplexer in communication with each output of the framer/deframer 204, followed by one or more filters between the demultiplexer and the backplane 110. In the uplink direction, the digital interface card 104 can include a filter for each input to a multiplexer before the framer/deframer 204.

The framer/de-framer module 204 can use $I_{UL}(n)$, $Q_{UL}(n)$ to generate uplink digital signals in the standardized format. For example, the framer/de-framer module 204 can frame $I_{UL}(n)$, $Q_{UL}(n)$ into data packets with a frame structure specified by the standardized format. The data packets generated by the framer/de-framer module 204 can include uplink digital signals in the standardized format. In some aspects, each data packet includes a frame having control data and a frame having carrier data. Control data for the uplink digital signals in the standardized format can be provided by controller 208. Controller 208 can generate the control data using the control data extracted from the downlink digital signals in the standardized format.

Uplink signals from framer/de-framer module 204 can be transmitted to digital base station 13 via PHY 202. PHY 202 can convert uplink signals to the proper format for transmission to digital base station 13. For example, PHY 202 can convert electrical signals received from framer/de-framer module 204 to optical signals for transmission over a fiber-optic cable.

Figure 4:
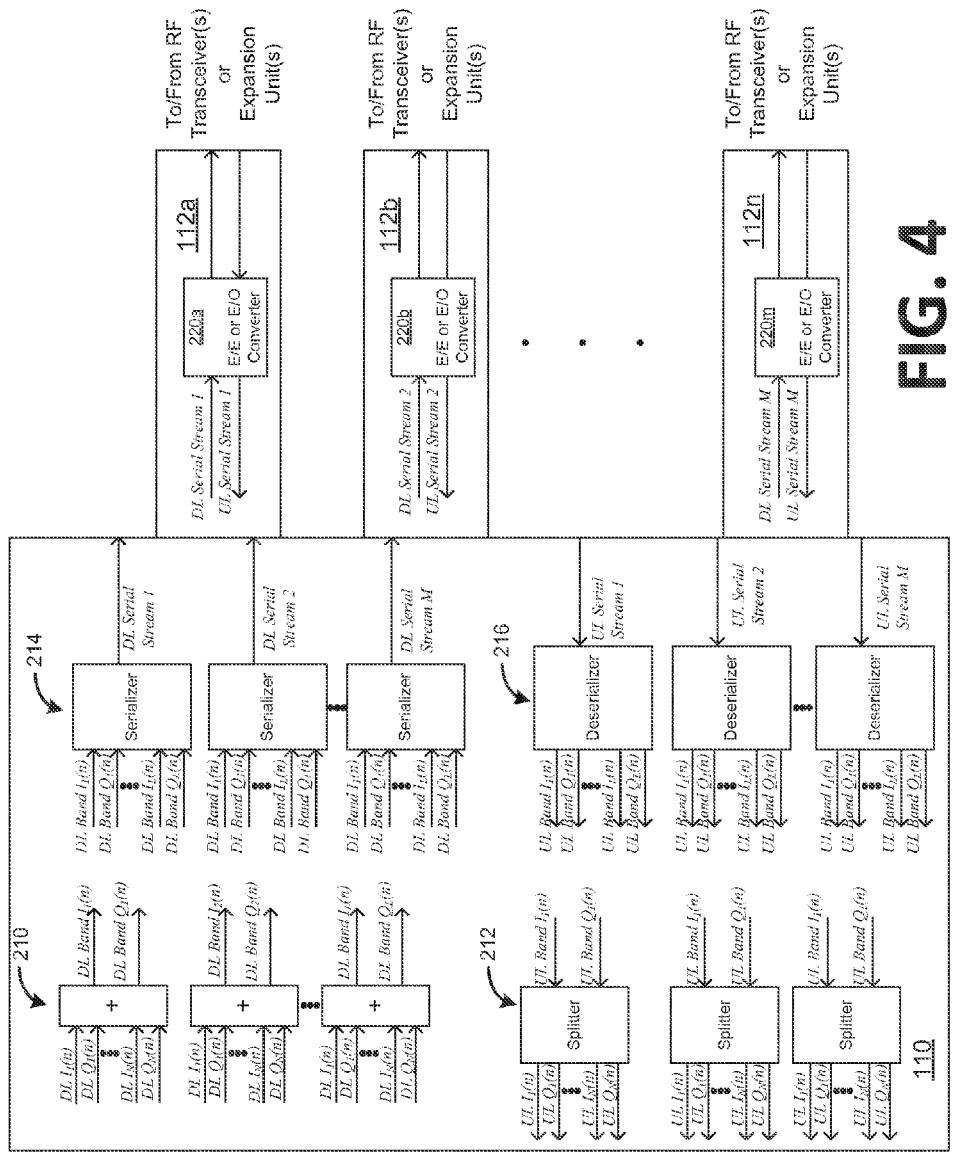
FIG. 4 is a partial schematic view of the backplane and link interfaces of the master unit of FIG. 2 according to one aspect.

FIG. 4 depicts additional details of a backplane 110 and link interfaces 112a-n according to one aspect. The backplane 110 can include one or more summers 210, splitters 212, and serializer/deserializers ("SerDes") 214, 216.

In a downlink direction, the summers 210 can combine complex digital signals from one or more interface cards. In some aspects, each summer combines complex digital signals associated with frequencies in a common band. The outputs of the summers are combined downlink digital signals in a complex format, depicted as DL Band $I_{1-L}(n)$, DL Band $Q_{1-L}(n)$.

The combined downlink digital signals can be provided in parallel to serializers 214. The serializers 214 can convert parallel signals to serial signals by combining parallel downlink digital signals into serialized downlink signals. The serialized downlink signals are depicted in FIG. 4 as DL Serial Stream 1-M. The serializers 214 can provide DL Serial Stream 1-M to link interfaces 112a-n for transmission to RF transceivers and/or expansion units. The link interfaces 112a-n can include electrical-to-electrical or electrical-to-optical converters 220a-n that convert the serial streams for transporting the streams on the particular type of transport link coupled to the link interfaces 112a-n.

In an uplink direction, the converters 220a-n can convert uplink streams of signals to electrical streams of signals and provide the electrical streams of signals, depicted as UL Serial Stream 1-M, to the deserializers 216. The deserializers 216 can de-multiplex the streams of signals into parallel complex digital signals in bands. The parallel complex digital signals are depicted as UL Band $I_{1-L}(n)$, UL Band $Q_{1-L}(n)$. A band can include multiple signals or just one signal. In some aspects, the backplane can include one or more summers (not shown) between the deserializers 216 and the splitters 212 for summing signals of a band from multiple deserializers 216 together.

The splitters 212 can receive the parallel complex digital signals in bands and split the bands into complex digital signals, depicted in FIG. 4 as UL $I_{1-L}(n)$, UL $Q_{1-L}(n)$. UL $I_{1-L}(n)$, UL $Q_{1-L}(n)$ can include the uplink complex digital signals to be processed by analog interface cards 102 and digital interface card 104. In some aspects, the splitters 212 isolate each uplink baseband digital signal using band-pass filters. Each band-pass filter can pass a different frequency.

Figure 5:
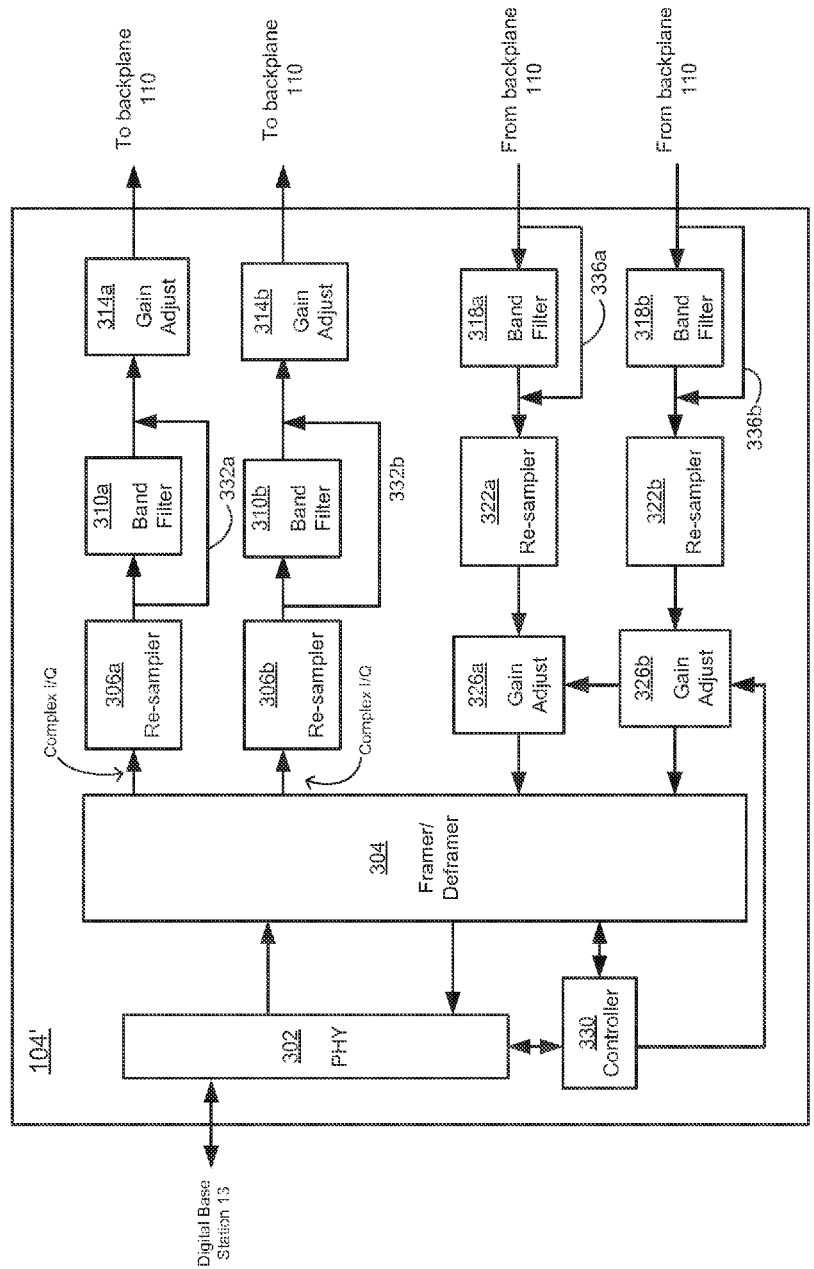
FIG. 5 is a block diagram of an interface card of a master unit for processing signals in a standardized format according to a second aspect.

FIG. 5 depicts an alternative example of a digital interface card 104'. The digital interface card 104' includes a physical layer device ("PHY") 302, a framer/de-framer module 304, and a controller 330. In a downlink path, the digital interface card 104' includes re-samplers 306a, 306b, band filters 310a, 310b, and gain adjust devices 314a, 314b. In an uplink path, the digital interface card 104' includes band filters 318a, 318b, re-samplers 322a, 322b, and gain adjust devices 326a, 326b.

The digital interface card 104' can receive and transmit digital signals in a standardized format via PHY 302. The PHY 302 can provide the same conversion, synchronization, and error checking functions as PHY 202 depicted in FIG. 4. The PHY 302 can provide the downlink digital signal in a standardized format to framer/de-framer module 304. The framer/de-framer module 304 can perform the same data-extraction and data-combining functions as the framer/de-framer module 204 depicted in FIG. 3. In the downlink path, the framer/de-framer module 304 can de-frame the downlink digital signal in the standardized format to extract control data and carrier data from each data packet. The framer/de-framer module 304 can provide the control data to controller 330. The controller 330 can receive control data from framer/de-framer module 304. The controller 330 can use the downlink control data from framer/de-framer module 304 to generate the corresponding uplink control data for uplink digital signals in the standardized format.

The framer/de-framer module 304 can convert the carrier data into a downlink complex digital signal that is provided to re-samplers 306a, 306b. Although two re-samplers 306a, 306b are depicted, more than two re-samplers can be used. The downlink complex digital signal may be a baseband digital signal that is an I/Q signal. The downlink complex digital signal outputted by the framer/de-framer module 304 can also include multiple I/Q channels. Each I/Q channel can represent a portion of a frequency band to be provided to a remote unit or group of remote units. For example, the downlink complex digital signal can include one channel with frequencies within the A and B frequency blocks of the cellular frequency band and another channel with frequencies within one of the frequency blocks of the personal communications services ("PCS") frequency band (i.e., 1850-1990 MHz). Re-samplers 306a, 306b and band filters 310a, 310b can isolate each I/Q channel. While FIG. 5 depicts the digital interface card 104' isolating two I/Q channels from the downlink complex digital signal outputted by the framer/de-framer module 304, a digital interface card according to additional or alternative aspects can isolate any number of I/Q channels from the downlink complex digital signal, including one.

The re-samplers 306a, 306b can be fractional re-samplers capable of re-sampling the complex digital signal at a resample rate that is selected based on the bandwidth associated with each I/Q channel included in the complex digital signal and the bandwidth of the communication medium between master unit 14 and remote antenna units 14a, 14b. For example, the bandwidth of the complex digital signal may be 40 MHz, while the bandwidth of each desired I/Q channel is 5 MHz. The communication medium may have bandwidth sufficient for transferring the I/Q channel with a bandwidth of 5 MHz, but not the entire bandwidth of the complex digital signal. Re-sampling the complex digital signal at a lower sampling rate can optimize the complex digital signal for transmission over the communication medium. In some aspects, each of the re-samplers 306a, 306b can re-sample a complex digital signal according to a resample rate, N/M, that is selected based on factors such as the bandwidth of the corresponding I/Q channel. Non-limiting examples of N include integer values of 1 to 15 for various I/Q channel bandwidths. Each value of N can correspond to a bandwidth, with each subsequent bandwidth incremented by 5 MHz (e.g., N=1, bandwidth=5 MHz; N=2, bandwidth=10 MHZ; N=3, bandwidth=15 MHZ). An example of M is 30.

The re-samplers 306a, 306b can provide the re-sampled digital signal to band filters 310a, 310b. Each of the band filters 310a, 310b can filter the digital signal according to configured filtering characteristics. By filtering the digital signal, band filters 310a, 310b can isolate specific I/Q channels from the digital signal. For example, the band filter 310a can pass frequencies within the A or B frequency blocks of the cellular frequency band, while the band filter 310b can pass frequencies within one of the frequency blocks of the PCS frequency band. The band filters 310a, 310b can provide filtered complex digital signals, each representing a different I/Q channel, to gain adjust devices 314a, 314b. The band filters 310a, 310b may include a filter bypasses 332a, 332b. Each of the filter bypasses 332a, 332b can be selectively operated to pass the entire re-sampled digital signal, if desired.

The digital gain adjust devices 314a, 314b can be controlled by controller 330 and can apply a gain function to the complex digital signals. The gain function can optimize a dynamic range of the complex digital signals for processing by backplane 110. Optimizing the dynamic range can include scaling the power of complex digital signals according to a configured value. Scaling the power of the complex digital signals can prevent overload of summers in the backplane.

In the uplink direction, band filters 318a, 318b can filter uplink signals that are complex digital signals from the backplane 110. The band filters 318a, 318b can be associated with filter bypasses 336a, 336b. Each of the filter bypasses 336a, 336b can be selectively operated to pass the entire uplink digital signal, if desired.

The filtered digital signals, or bypassed digital signals, may be associated with a sample rate that is optimized for transmission on a transport link between a master unit and an RF transceiver or an expansion unit. The digital signals can be received by re-samplers 322a, 322b, which can re-sample the complex digital signals to a sample rate corresponding to original sample rates used in processing by framer/de-framer module 304. Re-samplers 322a, 322b can provide re-sampled digital signals to the gain adjust devices 326a, 326b. Although two re-samplers 326a, 326b are depicted, more than two re-samplers can be used.

In some aspects, the sampling rate of the re-samplers 322a, 322b is different than the sampling rate of the re-samplers 306a, 306b. For example, different sampling rates may be required if the bandwidth of a communication medium between a master unit and the digital base station 13 is different from the bandwidth of a communication medium between the master unit and the remote units or expansion unit. For example, the uplink and downlink resample rates may be different if the communication medium between the master unit and the digital base station 13 has a one Gbps bandwidth, while the communication medium between the master unit and the remote units or expansion unit has a ten Gbps bandwidth.

The gain adjust devices 326a, 326b can adjust the power level of uplink complex digital signals to a power level suitable for processing by framer/de-framer module 304, in accordance with configured characteristics of the gain adjust devices 326a, 326b. The gain adjust devices 326-b can provide gain-adjusted digital signals to framer/de-framer module 304.

The framer/de-framer module 304 can frame the complex digital signals by converting the complex digital signals into data packets using a frame structure specified by the standardized format. The data packets generated by framer/de-framer module 304 can include uplink digital signals in the standardized format. Each data packet can include a frame containing control data and a frame containing carrier data. Control data for the uplink digital signals in the standardized format can be provided by controller 330. The controller 330 can generate the control data using the control data extracted from the downlink digital signals in the standardized format. Carrier data can be generated from the uplink complex digital signal.

Uplink signals from framer/de-framer module 304 can be transmitted to digital base station 13 via PHY 302. The PHY 302 can convert uplink signals to a proper format, such as optical signals, for transmission to digital base station 13.

In some aspects, re-samplers, such as re-samplers 306a, 306b, can be used to resample one or more signals to a rate that is compatible with the DAS (even if the DAS is frequency locked to a base station). For example, the DAS may interface to a Universal Mobile Telecommunications System ("UMTS") base station from which the DAS can receive a single RF channel having digitized RF that uses CPRI at a complex sample rate of four samplers per symbol, or 15.36 MSPS. The DAS may receive the digitized RF such that the sample rate is an integer multiple of the symbol rate used for the modulation. The DAS may use a reference that is based on a 200 MHz reference signal. The DAS frequency may not be an integer multiple of the chip rate. The DAS can use, for example, a sample rate of 200 MHz divided by 32, or 6.25 MHz to represent the single RF channel. The re-samplers 306a, 306b can resample the signal from 15.36 MHz to a sample rate of 6.25 MHz, for example, to be compatible with other components of the DAS, such as framers/deframers. Re-samplers 306a, 306b may down convert by resampling the signal by fractional rate of 625/1536 and may interpolate the signal sampled at 15.36 MHz by 625. The re-samplers 306a, 306b may then decimate by 1536 (e.g. 15.36 MHz multiplied by (625/1536), or 6.25 MHz). Re-samplers 322a, 322b in the uplink direct may perform an opposite signal processing process. For example, the master unit can receive a digital signal having a rate of 6.25 MHz from a remote unit. Re-samplers 322a, 322b can resample the signal by 1536/625 to obtain the sample rate that is compatible with the base station in this example, which is 15.36 MHz. The resampling ration may depend on the air interface standard and the bandwidth of the signal.

In some aspects, band filters 310a, 310b, 318a, 318b and/or re-samplers 306a, 306b, 326a, 326b can perform matched filtering functions. Matched filtering can provide communication links with more desirable, and in some cases optimal, signal-to-noise ratio performance at a receiver when white noise is present. An example of a matched filter is a Root Raised Cosine filter, which may be used in UMTS base stations. For example, a UMTS base station may include a transmit filter and a mobile device may include a receive filter that cooperate to result in a raised cosine matched filter. The cascade (convolution) of the two filters can be a matched filter. In the uplink direction, the mobile device may include a transmit filter that can cooperate with a receive filter in the base station to provide the matched filter. The band filters and/or re-samplers can be used to provide a matched filtering function with filters in the base station and/or mobile device. For example, a re-sampler or band filter may be cascaded with a filter in the base station to result in matched filter.

Base Station Emulator Module

Figure 6:
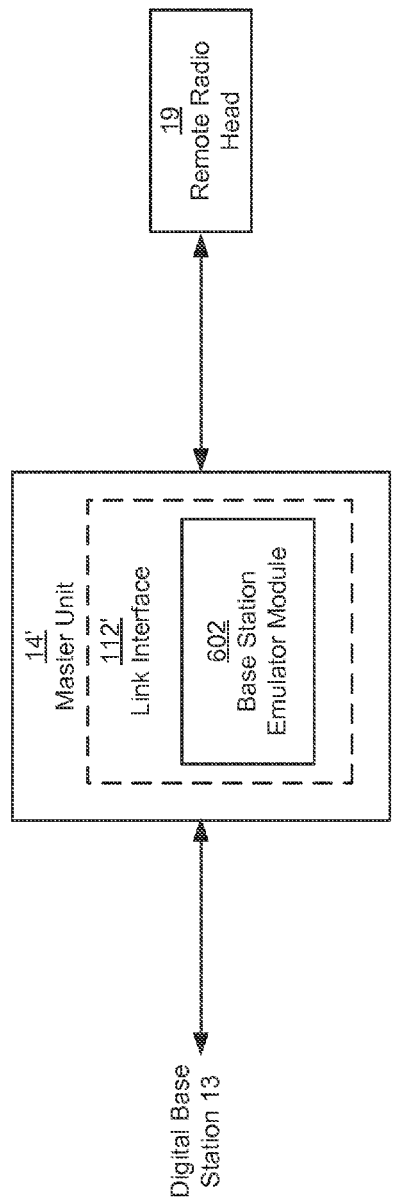
FIG. 6 is a block diagram of a master unit having a base station emulator module for communicating with a remote radio head according to one aspect.
Figure 7:
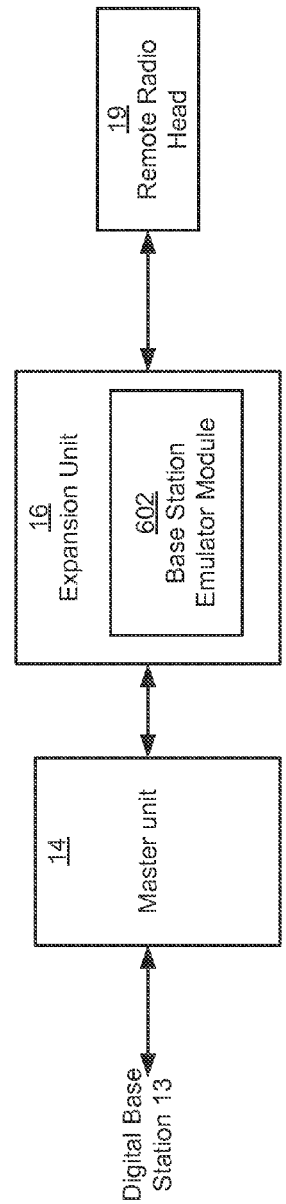
FIG. 7 is a block diagram of an expansion unit having a base station emulator module for communicating with a remote radio head according to one aspect.

FIGS. 6 and 7 depict certain aspects of a DAS that can include base station emulator modules that can communicate with remote radio heads. FIG. 6 depicts a base station emulator module 602 disposed in a link interface 112' of a master unit 14'. The master unit 14' can be disposed in a DAS. The base station emulator module 602 in the link interface 112' can emulate a source of digital signals in a standardized format. These digital signals can include downlink information to be wirelessly communicated to user devices and can be provided to a remote radio head 19. For example, the base station emulator module 602 can transform downlink complex digital signals into digital signals in a standardized format to be provided to the remote radio head 19. The base station emulator module 602 can receive uplink digital signals in a standardized format from the remote radio head 19 and transform these signals into complex digital signals for processing by a backplane.

In FIG. 7, the base station emulator module 602 is disposed in the expansion unit 16 to allow the expansion unit 16 to communicate with a remote radio head configured to receive digital signals in a standardized format. For example, downlink complex digital signals can be received by the expansion unit 16 from the master unit 14. The base station emulator module can transform the downlink complex digital signals into digital signals in a standardized format that are provided to the remote radio head 19. In the uplink direction, the base station emulator module can transform uplink digital signals in a standardized format received from the remote radio head 19 into complex digital signals that are provided to the master unit 14.

In some aspects, a master unit 14 can include an interface section with one or more digital interface cards 104 and a base station emulator module 602. The digital interface card 104 can process digital signals in a standardized format that is different from the standardized format used by base station emulator module 602.

For example, a first digital base station 13 may provide signals to a DAS formatted according to the CPRI protocol and a second digital base station 13 may provide signals to the DAS formatted according to a vendor's proprietary protocol. The DAS may include one or more remote radio heads 19 that communicate signals formatted according to the ORI protocol. A master unit 14 disposed in the DAS can include an interface section with digital interface cards 104 for processing signals formatted according to the CPRI and proprietary protocols. The processed signals can be combined at a backplane 110. The master unit 14 can also include a base station emulator module 602 for transforming the combined signals into signals formatted according to the ORI protocol. The signals formatted according to the ORI protocol can then be provided to the remote radio head 19.

A DAS using a base station emulator module 602 can include both remote radio heads 19 and remote units 18. A master unit 14 or expansion unit 16 can use the base station emulator module 602 to provide signals to remote radio heads 19 at a higher power than is used to provide signals to the remote units 18.

Figure 8:
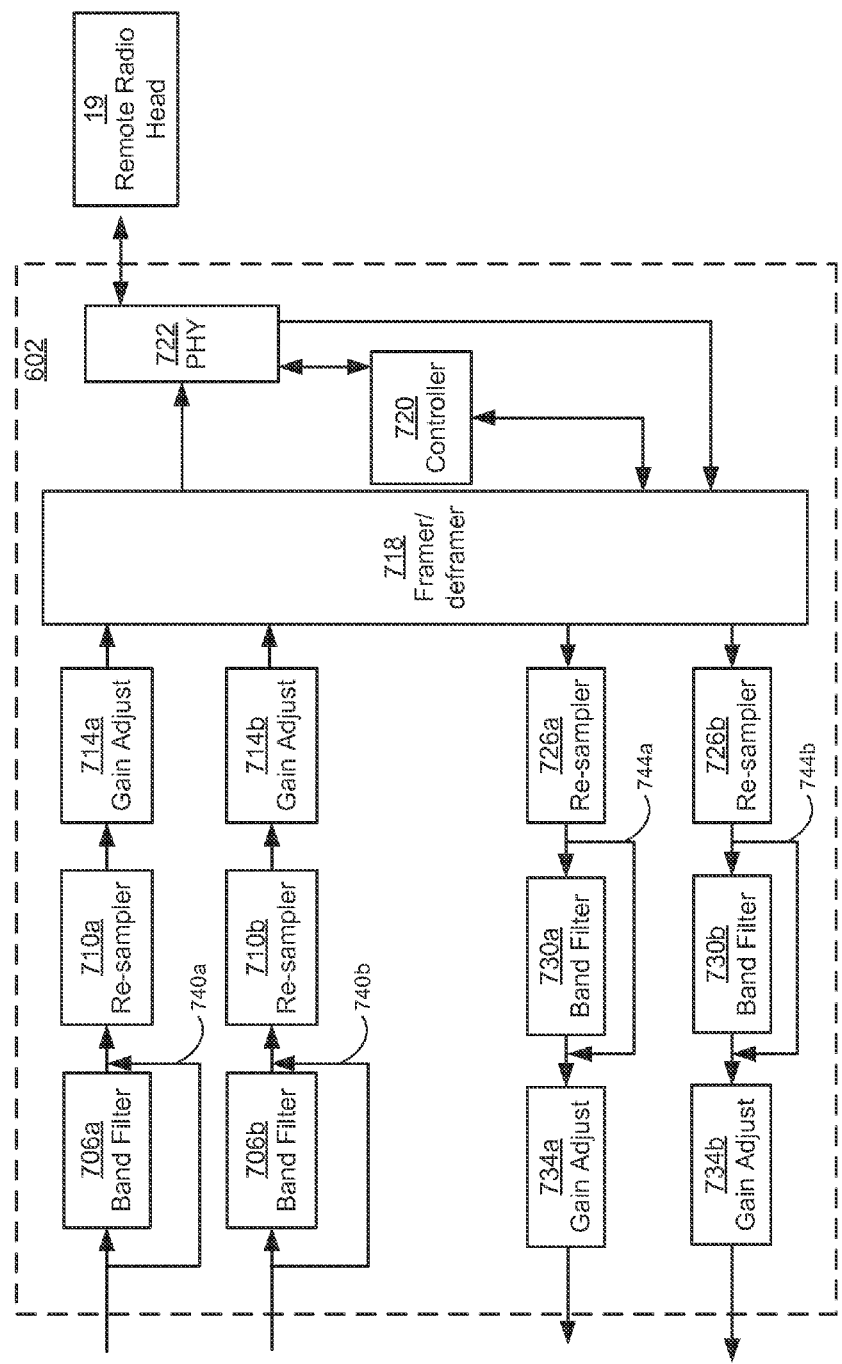
FIG. 8 is a block diagram of the base station emulator module of FIGS. 6 and 7 according to one aspect.

FIG. 8 depicts one aspect of a base station emulator module 602. The base station emulator module 602 includes a framer/de-framer module 718, a controller 720, and a PHY 722. In a downlink path, the base station emulator module 602 includes band filters 706a, 706b, re-samplers 710a, 710b, and gain adjust devices 714a, 714b. In an uplink path, the base station emulator module 602 includes re-samplers 726a, 726b, band filters 730a, 730b, and gain adjust devices 734a, 734b.

The framer/de-framer module 718 can perform the same data-extraction and data-combining functions as the framer/de-framer modules 204, 304 depicted in FIGS. 3, 5. In the downlink direction, the framer/de-framer module 718 can convert complex digital signals into downlink digital signals in a standardized format. The standardized format can be a standardized telecommunication protocol used by a remote radio head 19, such as CPRI, ORI, or OBSAI. Control data can be provided by controller 720. Carrier data can be generated from the downlink complex digital signals. Framer/de-framer module 718 can provide downlink signals in a standardized format to PHY 722.

PHY 722 can provide similar conversion, synchronization, and error checking functions as PHY 202, 302 depicted in FIGS. 3, 5. The base station emulator module 602 can receive and transmit digital signals in a standardized format via PHY 722.

In the uplink direction, the framer/de-framer module 718 can de-frame uplink digital signal in a standardized format. Framer/de-framer module 718 can provide control data extracted from the uplink digital signal to controller 720. Controller 720 can use the control data extracted from the uplink signal to generate the control data added to the downlink signal. Framer/de-framer module 718 can also convert carrier data extracted from the uplink digital signal into an uplink complex digital signal.

The re-samplers, band filters, and gain adjust devices of base station emulator module 602 perform functions similar to the corresponding components in the digital interface card 104'. In a downlink direction, band filters 706a, 706b can filter the downlink complex digital signals according to configured filtering characteristics. Each band filter 706a, 706b can pass individual component signals of the downlink complex digital signal at frequencies within a given frequency band. Each band filter 706a, 706b can pass individual downlink complex digital signals to be transmitted via a remote radio head 19 and reject or attenuate other downlink complex digital signals to be transmitted via other RF transceivers. The band filters 706a, 706b can provide filtered digital signals, each representing an individual downlink complex digital signal, to the re-samplers 710a, 710b. The band filters 706a, 706b may also include filter bypasses 740a, 740b. Each of the filter bypasses 740a, 740b can be selectively operated to pass the entire complex digital signal, if desired.

The filtered digital signals, or bypassed digital signals, may be associated with a sample rate that is optimized for transmission on a transport link between a digital base station and a master unit or between a master unit and an expansion unit. The re-samplers 710a, 710b can re-sample the filtered digital signals to a sampling rate suitable for processing by the framer/de-framer 718 and acceptable to the remote radio head 19. The new sampling rate can be specified by the standardized format used by the remote radio head 19. The re-samplers 710a, 710b can provide re-sampled downlink baseband digital signals to gain adjust devices 714a, 714b.

The gain adjust devices 714a, 714b can apply a gain function to the downlink complex digital signals. The gain function can adjust the power of the downlink complex digital signals to the power specified by the standardized format used by the remote radio heads 19a, 19b. In some aspects, the gain function may be a frequency dependent gain and/or a phase of group delay based on processing functions, that is applied to the digital samples. Gain adjust devices 714a, 714b can provide the downlink complex digital signals to framer/de-framer module 718.

In an uplink direction, re-samplers 726a, 726b can receive an uplink complex digital signal from the framer/de-framer module 718. Re-samplers 726a, 726b can re-sample the uplink complex digital signal to a sampling rate optimized for transmission over a transport link from the expansion unit to the master unit or from the master unit to the digital base station. Re-samplers 726a, 726b can provide the uplink complex digital signal to band filters 730a, 730b.

Band filters 730a, 730b can filter the uplink complex digital signals according to configured filtering characteristics. Each uplink complex digital signal may include one or more component complex digital signals. Each band filter 730a, 730b can pass a specific frequency band corresponding to an individual component complex digital signal. The band filters 730a, 730b can provide the filtered uplink complex digital signals to gain adjust devices 734a, 734b. The band filters 730a, 730b may also include the filter bypasses 744a, 744b, which can be selectively operated to pass the entire uplink complex digital signal, if desired.

The gain adjust devices 734a, 734b can apply a gain function the uplink complex digital signals. The gain adjust devices 734a, 734b can adjust the power level of uplink complex digital signals to a power level suitable for processing by the master unit 14' or the expansion unit 16, in accordance with configured characteristics of the gain adjust devices 734a, 734b.

Clock Management for Multiple Digital Base Station Interface

Figure 9:
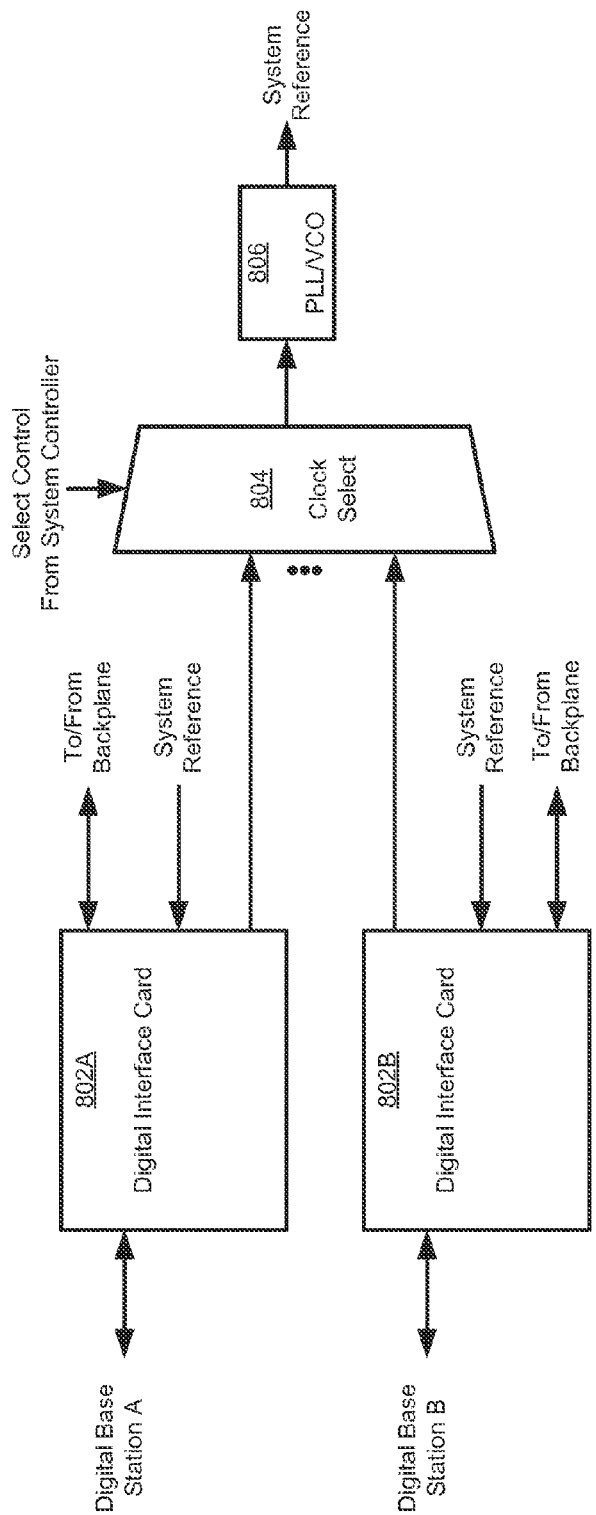
FIG. 9 is a block diagram of a master unit in communication with multiple digital base stations according to one aspect.

As noted previously, a DAS according to some aspects can transport signals between multiple digital base stations and remove devices. FIG. 9 depicts a block diagram of part of a master unit that can interface with multiple digital base stations, which are depicted as digital base station A and digital base station B. The master unit includes digital interface card 802A and digital interface card 802B in an interface section. Digital interface card 802A can interface with digital base station A. Digital interface card 802B can interface with digital base station B. Although not depicted, the master unit depicted in FIG. 9 may also include one or more analog interface cards that can interface with one or more analog base stations.

The master unit also includes components configured to manage frequency locking when the DAS interfaces with multiple digital base stations. For example, the master unit in FIG. 9 includes a clock select device 804 and a PLL/VCO device 806. In some aspects, the clock select device 804 and the PLL/VCO device 806 are disposed in the backplane. In other aspects, the clock select device 804 and the PLL/VCO device 806 are separate from the backplane. An example of the clock select device 804 is a multiplexer device.

The clock select device 804 can receive recovered clock signals from each of the digital interface cards 802A, 802B. The recovered clock signals can be recovered from signals received from the digital base stations. The clock select device 804 can select a recovered clock signal received from the digital interface cards 802A, 802B based on select control commands received from a system controller.

In other aspects, the components include an accurate frequency reference receiver that can receive an accurate frequency reference from a external source, such as a global positioning system, or an internal source, such as an ovenized oscillator. The components can also include a PLL/VCO that can generate a system reference signal based on the accurate frequency reference. The system reference can be provided to components of the DAS. The master unit may include a drop/add FIFO, or similar device, to mitigate rate differences between the system reference and a clock signal used by one or more digital base stations to which the master unit interfaces.

Figure 10:
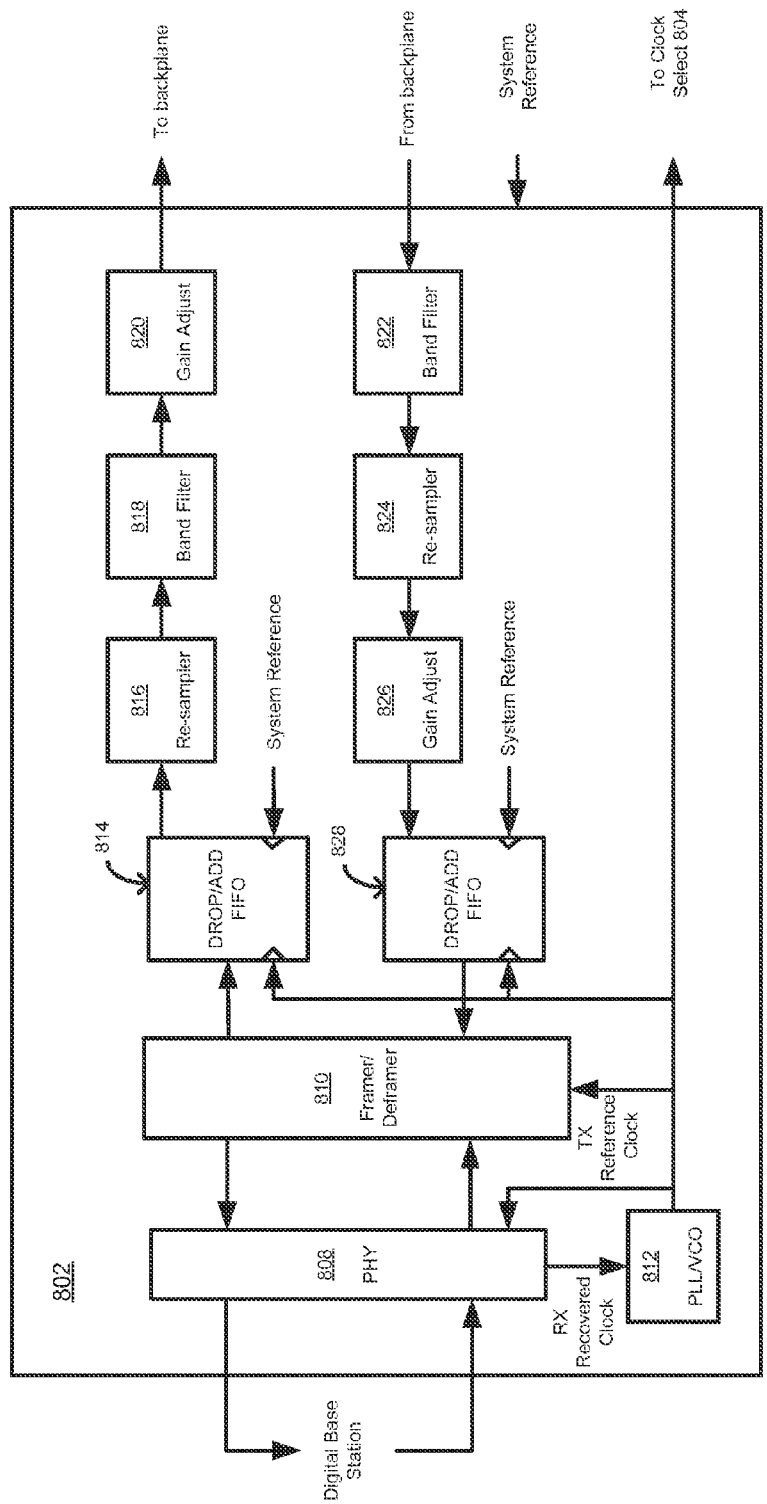
FIG. 10 is a block diagram of a digital interface card of FIG. 9 according to one aspect.

FIG. 10 depicts a block diagram of a digital interface card 802 from FIG. 9. The digital interface card 802 interfaces with a digital base station and includes many of the same or similar components as the digital interface cards that have been previously described. For example, the digital interface card 802 includes a PHY 808 and a framer/deframer 810. In the downlink direction, the digital interface card 802 includes a re-sampler 816, band filter 818, and gain adjust 820. Although one of each of these components is depicted, the digital interface card 802 can include more than one of each component in the downlink direction to process complex I/Q signals, for example. The output of the digital interface card 802 to the backplane may be a complex digital signal. In the uplink direction, the digital interface card 802 includes a band filter 822, re-sampler 824, and a gain adjust 826. Although one of each of these components is depicted, the digital interface card 802 can include more than one of each component in the uplink direction to process complex I/Q signals, for example. The digital interface card 802 may receive a complex digital signal from the backplane. Furthermore, the digital interface card 802 may include other components, such as a controller as described above in connection with digital interface card 104.

The digital interface card 802 also includes a PLL/VCO 812 and two drop/add FIFOs 814, 828. The PHY 808 can recover a clock signal from signals received from the digital base station. The received recovered clock signal can be provided to the PLL/VCO 812, which can generate a reference clock signal that is based on the received recovered clock signal. The reference clock signal can be provided to the clock select 804, to the PHY 808 as a transmit reference clock signal, to the framer/deframer 810, and to the two drop/add FIFOs 814, 828. The drop/add FIFOs 814, 828 can also receive a system reference signal from the PLL/VCO 806 of FIG. 9. The drop/add FIFO 814 can receive data signals from the framer/deframer 810 and provide data signals to the re-sampler 816. The drop/add FIFO 828 can receive signal from gain adjust 826 and provide signals to the framer/deframer 810. Drop/add FIFOs 814, 828 may be disposed between the framer/deframer 810 and an output section.

When interfacing with multiple digital base stations, differences may be present in the rate that digital bits of a complex digital signal enter and leave the framer/deframer 810. For example, if the DAS is frequency locked to one base station and a second base station is clocked at a higher frequency, digitized bits that are received from the second base station by the DAS may be higher than the rate that the digitized bits are being provided in the downlink direction by the framer/deframer 810. These rate differences may result in a FIFO in the framer/deframer 810 to overflow at a time that can depend on the frequency differences between the two base stations and the depth of the FIFO. A similar issue may occur in the uplink direction. Drop/add FIFOs 814, 828 can mitigate or eliminate problems associated with different clock rates among base stations. For example, the drop/add FIFOs 814, 828 can be between the DAS clock domain and the framer/deframer clock domain, which is individually locked to a respective digital base station. The drop/add FIFOs 814, 828 can monitor the FIFO depth in real time and drop or add samples to the complex digital signals, depending on the depth of the FIFO.

Figure 11:
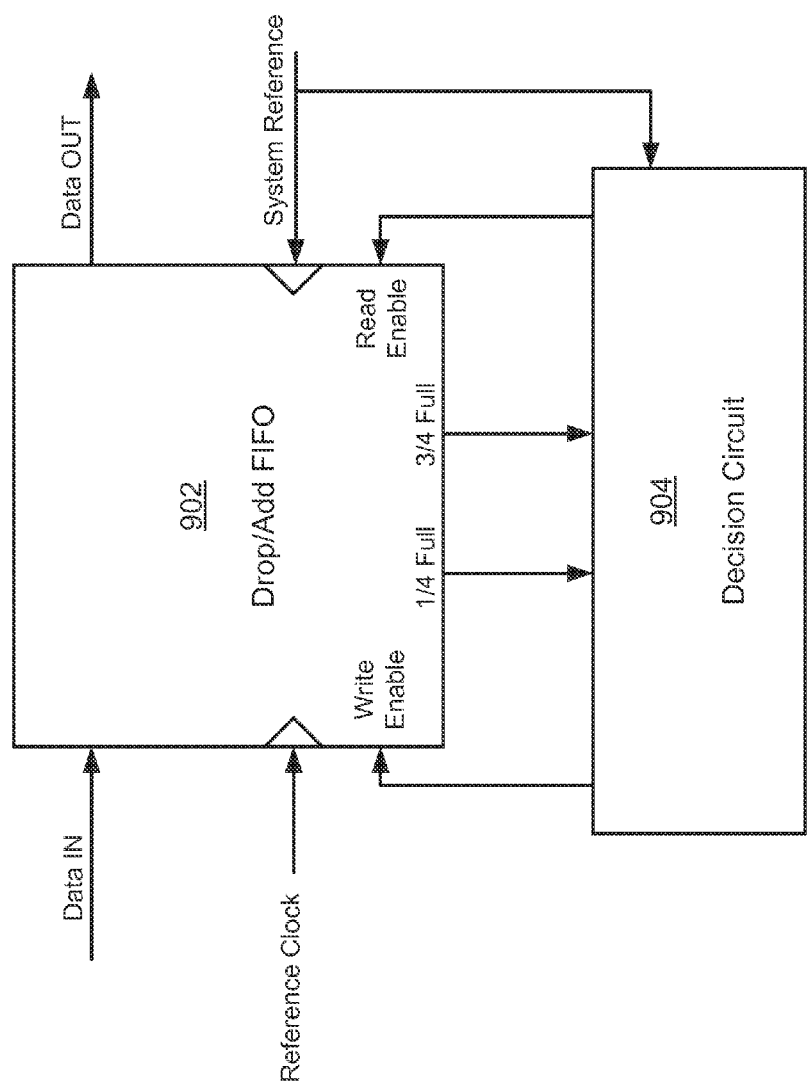
FIG. 11 is a block diagram of a drop/add FIFO and decision circuit that is capable of being included in the digital interface card of FIG. 10 according to one aspect.

FIG. 11 is a block diagram of a drop/add FIFO 902 that may be used as the drop/add FIFO 814 or the drop/add FIFO 828 that are depicted in FIG. 10. The drop/add FIFO 902 is in communication with a decision circuit 904, which may be part of the backplane, a separate component, or positioned external to a master unit of the DAS. The drop/add FIFO 902 includes an input to receive data (Data IN), an output to provide data (Data OUT), an input to receive a reference clock, such as a reference clock generated by PLL/VCO 812 in FIG. 10, and an input to receive a system reference, such as a system reference from PLL/VCO 806 in FIG. 9. The drop/add FIFO 902 also includes inputs from the decision circuit 904 that include a write enable and a read enable. The drop/add FIFO 902 includes outputs to the decision circuit 904, such as an indication that the drop/add FIFO 902 is a quarter full or three-quarters full.

When clock rates among multiple digital base stations differ, the drop/add FIFO 902 may approach full or empty status, depending on the rate difference. The decision circuit 904 can cause the drop/add FIFO 902 to drop digital bits periodically from the complex digital signal when the drop/add FIFO 902 is at a first threshold (e.g. a three-quarters full) and to repeat (i.e. add) bits periodically when the drop/add FIFO 902 is at a second threshold (e.g. a quarter full). The result may be that the DAS is synchronized by allowing periodic bit errors through drops or adds.

Alternatively, the DAS may zero fill a digital stream and then filter the resulting stream, by a low-pass filter for example, to smooth the resulting signal such that less spectral leakage is experienced based on discontinuity.

In some aspects, a remote unit can use clock offset information to reestablish an offset to a system reference, and generate a reference signal frequency locked to the second digital base station, by applying the offset to a clock signal for a re-sampler that re-samples complex digital signals and by applying the offset to RF frequency signals for signals from the second base station.

The foregoing description, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

The invention claimed is:

1. A unit of a distributed antenna system, the unit comprising:
an interface section configured for processing signals for communication between (i) a first base station configured for communicating the signals using a first standard communication protocol and a second base station configured for communicating the signals using a second standard communication protocol and (ii) a remote antenna unit that is not configured for processing the signals using the first standard communication protocol and the second standard communication protocol, wherein the interface section is configured for processing the signals by performing operations comprising:
receiving a first downlink signal comprising first packetized data that includes first carrier data and first control data formatted according to the first standard communication protocol,
receiving a second downlink signal comprising second packetized data that includes second carrier data and second control data formatted according to the second standard communication protocol, and
converting the first downlink signal and the second downlink signal from the first and second standard communication protocols into a format that allows the remote antenna unit to wirelessly transmit information from the first and second downlink signals to wireless user devices, wherein the interface section is configured for converting the first downlink signal and the second downlink signal by performing operations comprising:
extracting the first carrier data from the first packetized data and generating a first complex digital signal from the extracted first packetized data, and
extracting the second carrier data from the second packetized data generating a second complex digital signal from the extracted second packetized data; and
an output section configured for:
combining the first complex digital signal and the second complex digital signal into a combined digital downlink signal that comprises the information to be wirelessly transmitted, and
transmitting the combined digital downlink signal to the remote antenna unit in the format that allows the remote antenna unit to wirelessly transmit the information; and
wherein the interface section further comprises:
a first digital interface card for interfacing with a first digital base station and for outputting the first complex digital signal;
a second digital interface card for interfacing with a second digital base station and for outputting the second complex digital signal, the second digital base station being associated with a different frequency clock than a frequency clock associated with the first digital base station; and
a clock select device for selecting a system reference signal from a plurality of reference signals generated based on frequency clocks of the first digital base station and the second digital base station, the system reference signal being usable by components of the unit.

2. The unit of claim 1, wherein the output section is further configured for combining the first complex digital signal and the second complex digital signal into the combined digital downlink signal by summing a first plurality of digital samples from the first extracted carrier data and a second plurality of digital samples from the second extracted carrier data, wherein each of the first plurality of digital samples and the second plurality of digital samples represents a respective in-phase component and quadrature component.

3. The unit of claim 1, wherein the interface section is further configured for receiving an analog downlink signal received from an analog base station,
wherein the interface section comprises:
a digital interface device configured for transforming the first downlink signal into the first complex digital signal and transforming the second downlink signal into the second complex digital signal, and
an analog interface device configured for transforming the analog downlink signal into a third complex digital signal,
wherein the output section is further configured for combining the first complex digital signal, the second complex digital signal, and the third complex digital signal into the combined digital downlink signal.

4. The unit of claim 1, wherein the interface section further comprises:
   a physical layer device configured for receiving the first downlink signal and the second downlink signal; and
   a de-framer configured for:
      extracting the first carrier data from the first downlink signal, and
      extracting the second carrier data from the second downlink signal.

5. The unit of claim 1, wherein the first standard communication protocol comprises at least one of a Common Public Radio Interface protocol or an Open Radio Equipment Interface protocol and the second standard communication protocol comprises at least one of the Common Public Radio Interface protocol or the Open Radio Equipment Interface protocol.

6. The unit of claim 1, wherein the output section comprises a backplane configured for:
   combining the first complex digital signal and the second complex digital signal into the combined digital downlink signal, and
   outputting the combined digital downlink signal as serialized data over a serial link to an RF transceiver.

7. The unit of claim 1, wherein the interface section comprises a drop/add device and a decision circuit in communication with the drop/add device, wherein the decision circuit is configured for causing, based on a first clock rate for the digital base station being different from a second clock rate from an additional base station in communication with the unit, the drop/add device to perform at least one of (i) dropping bits from the first complex digital signal and (ii) adding bits to the first complex digital signal.

8. The unit of claim 1, wherein at least one of the first carrier data and the second carrier data comprises voice data from a digital base station to be outputted by the wireless user device and at least one of the first control data and the second control data comprises data for coordinating communication between the digital base station and a device receiving according to at least one of the first standard communication protocol and the second standard communication protocol.

9. The unit of claim 1, wherein the first standard communication protocol and the second standard communication protocol are the same standard communication protocol.

10. The unit of claim 1, wherein the first standard communication protocol and the second standard communication protocol are different standard communication protocols; and
   wherein the second standard communication protocol is incompatible with the first standard communication protocol, preventing the first carrier data from being combined with the second carrier data.

11. The unit of claim 7, wherein the drop/add device comprises a drop/add FIFO disposed between the output section and a framer/deframer configured for extracting at least one of the first carrier data and the second carrier data, wherein the decision circuit is configured for (i) causing the drop/add FIFO to drop bits of the first complex digital signal in response to the drop/add FIFO reaching a first depth threshold and (ii) causing the drop/add FIFO to add bits to the first complex digital signal in response to the drop/add FIFO reaching a second depth threshold.

12. The unit of claim 8, wherein the unit is configured to generate a system reference clock rate for the distributed antenna system based on a reference clock obtained from the digital base station.

13. A method comprising:
   processing, by a unit of a distributed antenna system, signals for communication between (i) a first base station that communicates the signals using a first standard communication protocol and a second base station that communicates the signals using a second standard communication protocol and (ii) a remote antenna unit that does not communicate the signals using the first standard communication protocol or the second standard communication protocol, wherein processing the signals for communication between (i) the first base station and the second base station and (ii) the remote antenna unit comprises:
      receiving a first downlink signal comprising first packetized data that includes first carrier data and first control data formatted according to the first standard communication protocol,
      receiving a second downlink signal comprising second packetized data that includes second carrier data and second control data formatted according to the second standard communication protocol, wherein the first downlink signal being formatted according to the first standard communication protocol and the second downlink signal being formatted according to the second standard communication protocol prevents the remote antenna unit from correctly transmitting information that is included in the first carrier data and the second carrier data, and
      converting the first downlink signal and the second downlink signal into a format that allows the remote antenna unit to wirelessly transmit the information to wireless user devices, wherein converting the first downlink signal and the second downlink signal comprises:
         extracting the first carrier data from the first packetized data and generating a first complex digital signal from the extracted first packetized data, and
         extracting the second carrier data from the second packetized data and generating a second complex digital signal from the extracted second packetized data;
   combining the first complex digital signal and the second complex digital signal into a combined digital downlink signal comprising the information to be wirelessly transmitted; and
   transmitting the combined digital downlink signal to the remote antenna unit in the format that allows the remote antenna unit to wirelessly transmit the information;
   wherein the second digital base station is associated with a different frequency than a frequency clock associated with the first digital base station; and
   selecting a system reference signal from a plurality of reference signals generated based on frequency clocks of the first digital base station and the second digital base station, the system reference signal being usable by components of the unit.

14. The method of claim 13, wherein combining the first complex digital signal and the second complex digital signal into the combined digital downlink signal comprises summing a first plurality of digital samples from the first extracted carrier data and a second plurality of digital samples from the second extracted carrier data, wherein each of the first plurality of digital samples and the second plurality of digital samples represents a respective in-phase component and quadrature component.

15. The method of claim 13, further comprising:
receiving an analog downlink signal received from an analog base station; and
transforming the analog downlink signal into a third complex digital signal, wherein the first complex digital signal, the second complex digital signal, and the third complex digital signal are combined into the combined digital downlink signal.

16. The method of claim 13, wherein the first standard communication protocol comprises at least one of a Common Public Radio Interface protocol or an Open Radio Equipment Interface protocol and the second standard communication protocol comprises at least one of the Common Public Radio Interface protocol or the Open Radio Equipment Interface protocol.

17. The method of claim 13, further comprising causing, based on a first clock rate for the first digital base station being different from a second clock rate for the second digital base station, performing at least one of (i) dropping bits from the first complex digital signal and (ii) adding bits to the first complex digital signal.

18. The method of claim 13, wherein processing the signals for communication between the base station and the remote antenna unit further comprises:
receiving an uplink signal from the remote antenna unit, and
formatting the received uplink signal according to the first standard communication protocol or the second standard communication protocol for transmission to the base station, wherein formatting the uplink signal comprises:
generating uplink control data using at least one of the first control data and the second control data,
generating uplink carrier data from the received uplink signal, and
outputting uplink packetized data having the uplink control data and the uplink carrier data.

19. The method of claim 13, wherein the first standard communication protocol and the second standard communication protocol are the same standard communication protocol.

20. The method of claim 13, wherein the first standard communication protocol and the second standard communication protocol are different standard communication protocols; and
wherein the second standard communication protocol is incompatible with the first standard communication protocol, preventing the first carrier data from being combined with the second carrier data.

* * * * *